March 11, 1958 G. A. BURCHELL 2,825,972
SCALE PIVOT GAUGES
Filed March 29, 1955
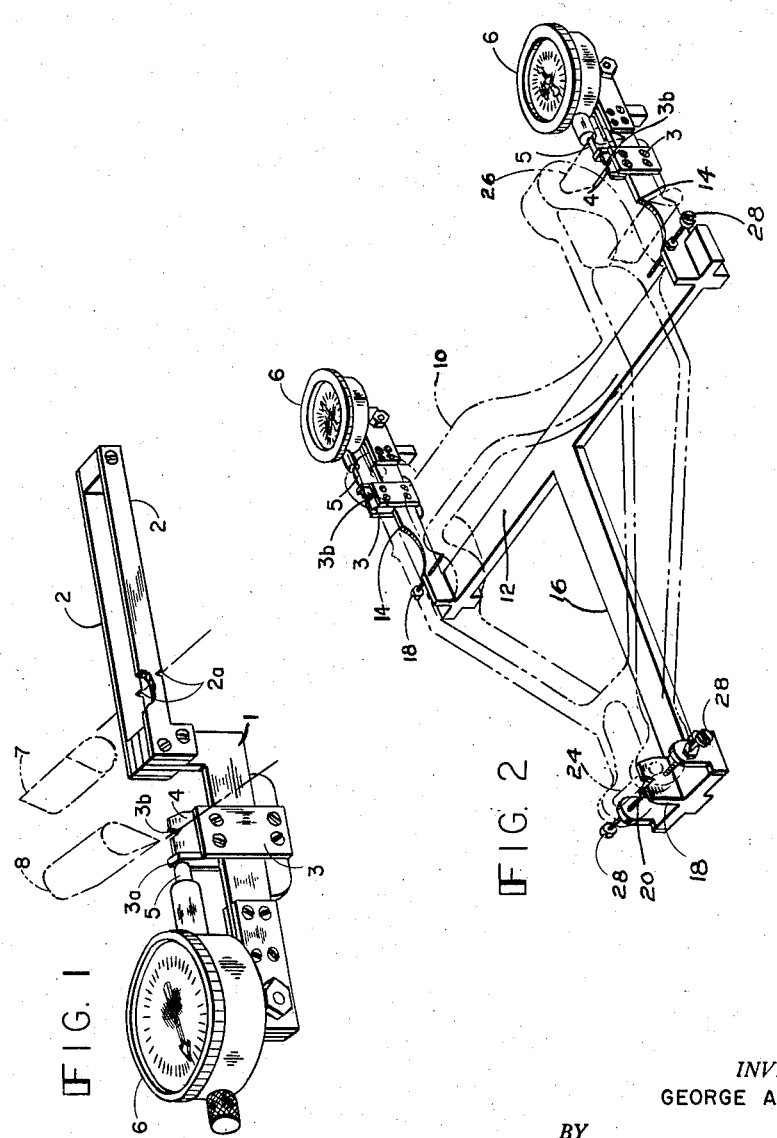
INVENTOR.
GEORGE A. BURCHELL
BY Porter, Chittick & Russell
ATTORNEYS ns patent office
United States Patent Office 2,825,972
Patented Mar. 11, 1958

2,825,972

SCALE PIVOT GAUGES

George A. Burchell, Wellesley Hills, Mass.

Application March 29, 1955, Serial No. 497,540

6 Claims. (Cl. 33—147)

This invention relates to an improved pivot gauge, which makes possible visible indication of the spacing of pivots in scale levers to a very accurate degree, and facilitates the setting of the pivots.

One important object of my invention is to make available a method of setting pivots so accurately that subsequent "sealing" of the levers separately before, or when they are combined in the scale, becomes unnecessary.

My invention further relates to arrangements and combinations of parts which will be hereinafter described and more particularly pointed out in the appended claims.

Preferred forms of the invention are shown in the drawings in which—

Fig. 1 shows a gauge for measuring what is called the "fulcrum" or the distance between the fulcrum pivot and load pivot; and Fig. 2 is a gauge for measuring the "long gauge" of levers or the distance between the fulcrum pivot and the tip or center pivot.

Referring to the drawings, the gauge shown in Fig. 1 comprises a frame 1 having fastened thereto an arm in the form of a pair of hardened steel blades 2 with an accurate V notch 2a cut in the lower edge of each, into which the edge of load pivot 7 is placed when in use.

Part 3 is an accurate sliding rider on frame 1. Rider 3 has an accurate V notch 3b cut in the top of the hardened steel blade 4 formed on the top piece of rider 3. The roots of all three notches are in a common plane parallel with the horizontal edges of frame 1. The fulcrum pivot 8 is placed into the notch on the rider 3 when in use.

The piece 4 forming the top of rider 3 also has one of its vertical edges machined to have an accurate end surface 3a which is at a perfect right angle to the travel of rider 3.

A dial indicator 6 of commercial type is mounted as shown on the end of frame 1 in such a manner that the stem 5 of the indicator rests against the machined surface 3a of rider 3 and so that the center line of the stem 5 is in the same horizontal plane as the roots of the notches in the blades 2 and the root of the notch in top of rider 3.

Consequently, when rider 3 is positioned by the fulcrum pivot 8 in its notch, the stem 5 of the dial indicator is in turn positioned so that the pointer indicates the spacing of the pivots accurately to within one graduation on the dial. Therefore, if a dial indicator accurate to $\frac{1}{10000}$ of an inch is used, the pivot spacing will be shown to that accuracy.

The gauge shown in Fig. 2 is for measuring the "long gauge" of scale levers and is shown with a lever 10 (in broken lines) disposed in measuring position. The gauge of Fig. 2 includes a frame comprising a transversely extending head 12 provided at its opposite ends with two identical parallel extensions 14 directed in one direction and also provided at its center with an arm 16 directed in the opposite direction. The free end of arm 16 is provided with an upstanding blade 18 having an accurate V-shaped notch 20 cut in its upper edge. Mounted at the free ends of extensions 14 are dial indicators 6 which are identical in construction and are mounted in the same manner as the dial indicator 6 of the gauge of Fig. 1. Also mounted on each extension 14 is a rider or slider 3 identical in construction to the slider embodied in the gauge of Fig. 1. Because of the identity in construction, the characters 4 and 3b are used again in Fig. 2 to identify the blades forming part of the sliders and the notches cut in said blades respectively.

As in the case of the corresponding elements of the gauge of Fig. 1, the center lines of the stems 5 of the two dial indicators 6 are in the same horizontal plane as the root of the notch 20 in blade 18 and the roots of the notches 3b in the blades 4 of the sliders 3.

In using the gauge of Fig. 2, the tip or center pivot 24 of the lever is placed in notch 20 and the fulcrum pivots 26 are placed in the notches 3b of the two sliders, as shown. The stems 5 of the indicators 6 engage the machined end surfaces of the sliders 3 and, when the sliders 3 are positioned by the fulcrum pivots 26, the stems 5 are positioned so that the pointers of the indicators accurately indicate the spacing between the tip pivot and the fulcrum pivots.

Screws 28 in the frame are provided to insure correct positioning of the lever 10 at the time the dials are being read. The screws 28 are set so that there is approximately $\frac{1}{8}''$ clearance between the ends of the screws 28 and the sides of the lever 10 when the lever is up against the screws 28 on the opposite side. When reading the gauges, the lever 10 should be pulled into position against the screws 28 on the same side as that on which the dial indicator 6, being read, is located.

In use, the dial indicators 6 are set at zero with a lever, similar to the ones for which the gauge has been made, which has the pivots spaced just as accurately as possible to the correct spacing.

After the indicators are set at zero, in this manner, the variations from the correct spacing of pivots is instantly visible when each subsequent lever is gauged.

Having thus described my invention and the advantages thereof, I do not wish to be limited to the details herein disclosed, otherwise than set forth in the claims, but what I claim is:

1. A gauge for measuring the spacing of pivots in scale levers comprising a frame provided with an arm having a first V-shaped notch, a slider carried by said frame, said slider having a second V-shaped notch, the notches in said arm and slider having their roots located in a common plane, a dial indicator carried by said frame, said indicator having an operating stem in planar alinement with said notches, said stem being controlled by said slider, whereby when said slider is moved so that the load pivot and the fulcrum pivot of a scale lever may be positioned in said first and second notches respectively, said stem will operate said dial indicator to provide a measurement of the spacing between said pivots.

2. A gauge for measuring the spacing of pivots carried by a scale lever comprising a frame, a dial indicator carried by said frame, said dial indicator having a movable pointer and a movable stem which when moved operates to change the position of said pointer to provide a new indication, an arm carried by said frame provided with a V-shaped notch for receiving one of the pivots of a scale lever, and a slider movably carried by said frame for moving said stem, said slider also having a V-shaped notch for receiving one of the pivots of a scale lever, the root of the slider notch being located in the same plane as the root of the V-shaped notch of said arm.

3. A gauge as defined by claim 2 wherein the notch in said arm is located in the bottom side thereof and the notch in said slider is located in the upper side thereof.

4. A gauge as defined by claim 2 wherein said frame has two parallel extensions, one of which carries said slider and dial indicator, and a second slider and a second dial indicator carried by the other of said extensions, whereby said gauge may be used to measure the distance between the fulcrum pivots and the center pivot of a scale lever.

5. A gauge for measuring the spacing of pivots carried by a scale lever comprising a frame, an indicator carried by said frame, said indicator having a movable pointer and a movable stem which when moved operates to change the position of said pointer to provide a new indication, an arm carried by said frame, said arm comprising two parallel spaced blades each provided with a V-shaped notch, said notches being alined with each other whereby to receive one of the pivots of a scale lever, and a slider movably carried by said frame for moving said stem, said slider also having a V-shaped notch for receiving another one of the pivots of a scale lever, the root of the slider notch being located in the same plane as the roots of the notches in said blades.

6. A gauge for measuring the spacing of pivots in scale levers comprising a frame provided with an arm having a V-shaped notch, a slider having a V-shaped notch movably mounted on said frame, and a dial indicator secured to said frame, said dial indicator having an operating stem in planar alinement with the roots of said notches, said stem being positioned to be actuated by said slider whereby when one of the pivots of a scale lever is positioned in the notch on said arm and said slider is moved to place its notch in position to receive another pivot of said same lever, said stem will be moved by said slider to operate said indicator to show a measurement of the spacing between said pivots.

References Cited in the file of this patent
UNITED STATES PATENTS
2,241,692    Williams _____ May 13, 1941